United States Patent [19]

Hormel

[11] Patent Number: 4,845,489
[45] Date of Patent: Jul. 4, 1989

[54] ELECTROLUMINESCENT DISPLAY DRIVE CIRCUITRY

[75] Inventor: Ronald F. Hormel, Mount Clemens, Mich.

[73] Assignee: Chrysler Motors Corporation, Highland Park, Mich.

[21] Appl. No.: 812,478

[22] Filed: Dec. 23, 1985

[51] Int. Cl.[4] .......................................... H05B 37/00
[52] U.S. Cl. .................................. 340/811; 340/781; 315/246; 315/169.3
[58] Field of Search .................. 315/307, 169.3, 169.4, 315/242, 244, 77, 264, DIG. 7, DIG. 5, 246; 340/752, 811, 781; 363/131, 133, 134

[56] References Cited

U.S. PATENT DOCUMENTS

| | | | |
|---|---|---|---|
| 2,937,298 | 5/1960 | Putkovich et al. | 315/169.3 |
| 3,107,314 | 10/1963 | Asars | 315/169.3 |
| 3,343,128 | 9/1967 | Rogers | 315/169.3 |
| 3,566,014 | 2/1971 | Norem | 315/169.3 |
| 3,611,177 | 10/1971 | Helbers | 315/169.3 |
| 3,629,653 | 12/1971 | Irwin | 315/169.3 |
| 3,975,661 | 8/1976 | Kanatani et al. | 315/169.1 |
| 4,210,848 | 7/1980 | Suzuki et al. | 315/169.3 |
| 4,247,854 | 1/1981 | Carpenter et al. | 315/169.4 |
| 4,319,164 | 3/1982 | Tulleners | 315/169.3 |
| 4,320,169 | 3/1982 | Yatabe et al. | 428/333 |
| 4,323,895 | 4/1982 | Coste | 340/782 |
| 4,388,554 | 6/1983 | Suntola et al. | 313/505 |
| 4,527,096 | 7/1985 | Kindlmann | 315/169.3 |
| 4,633,141 | 12/1986 | Weber | 315/169.3 |

FOREIGN PATENT DOCUMENTS

| | | | |
|---|---|---|---|
| 52-58388 | 5/1977 | Japan | 315/169.3 |
| 54-40586 | 3/1979 | Japan | 315/169.3 |

OTHER PUBLICATIONS

D.C. Electroluminescence For Automobile Instruments by B. Shepherd, R. N. Thomas and P. J. Smith; published by the Institute of Electrical Engineers, Jul. 6–9, 1976.

Electroluminescent Instrumentation by B. Shepherd, (SAE 810076), Feb. 1981.

Primary Examiner—Howard W. Britton
Assistant Examiner—Mark R. Powell
Attorney, Agent, or Firm—Mark P. Calcaterra

[57] ABSTRACT

An electroluminescent display drive circuit which compensates for the decrease in capacitance of the electroluminescent display panel that is experienced as the panel ages; this is accomplished by use of an RC time constant which will effectively increase the voltage presented across the electroluminescent display panel as the capacitive element of the RC time constant decreases with the age of the panel. Also presented is high frequency power supply to excite electroluminescent displays without a transformer such that the voltage across the display is in phase with the current through the display thereby reducing the effect of power factor and electromagnetic interference.

2 Claims, 2 Drawing Sheets

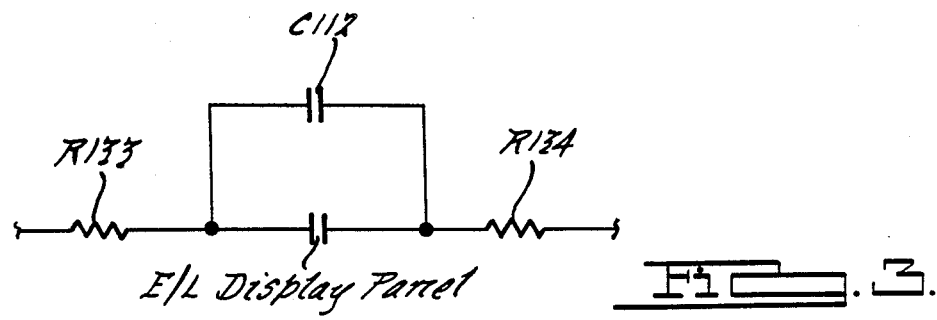
FIG. 3.
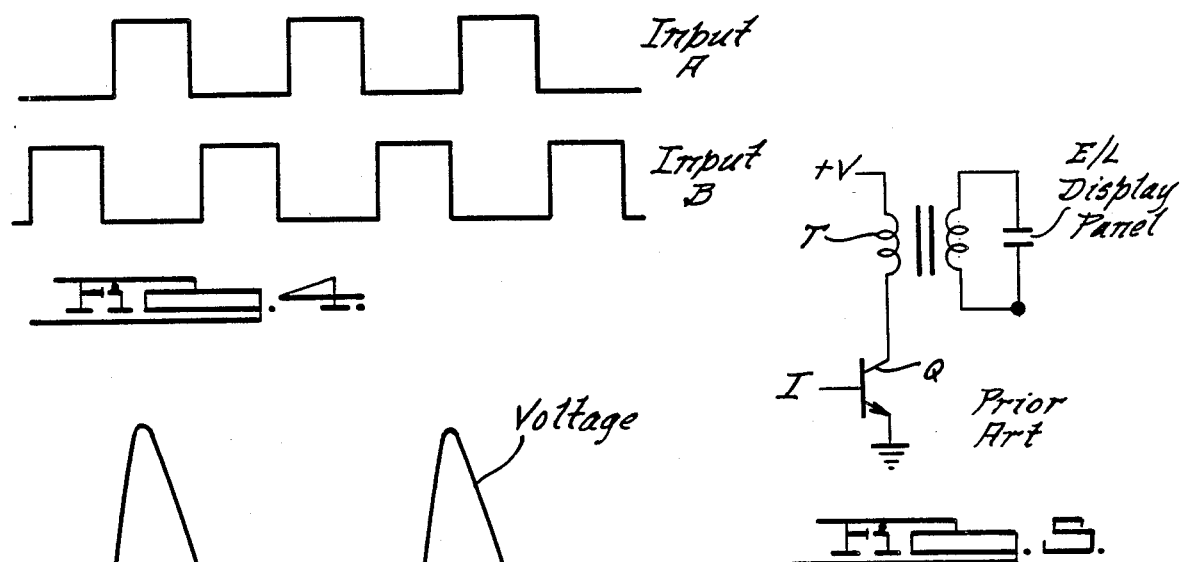
FIG. 4.
FIG. 5.
Prior Art
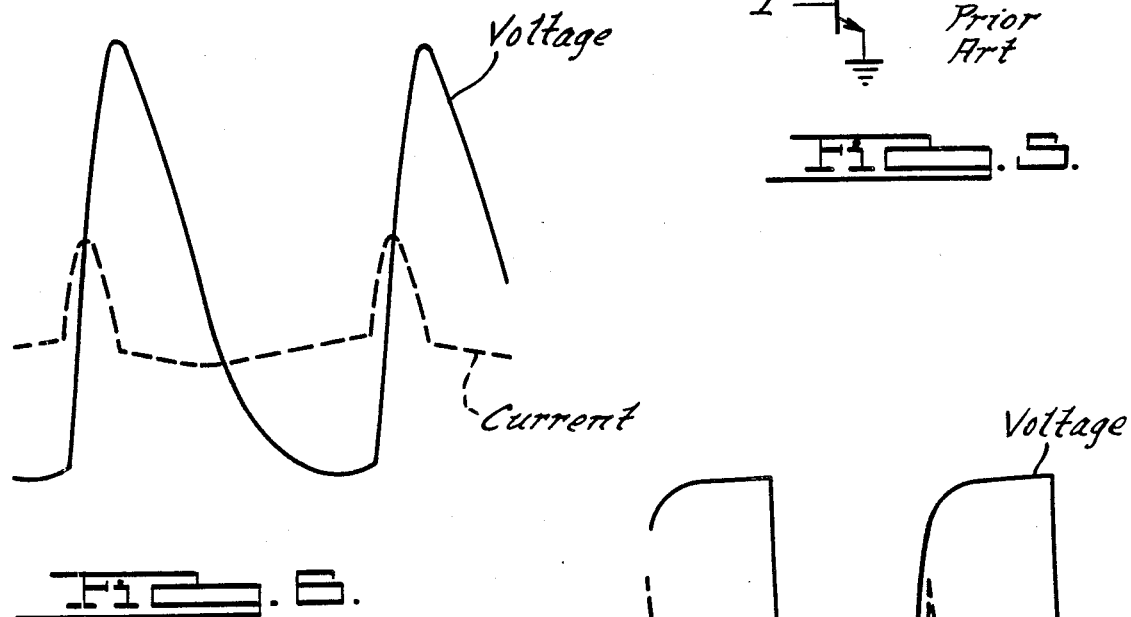
FIG. 6.
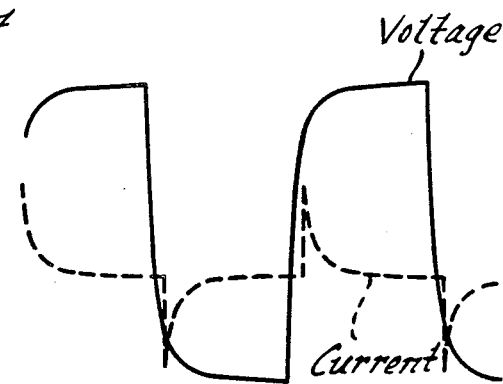
FIG. 7.

ELECTROLUMINESCENT DISPLAY DRIVE CIRCUITRY

BACKGROUND AND SUMMARY OF THE INVENTION

Electroluminescent display drive circuits (drivers) are traditionally driven by transformers. The transformer driven excitation of the electroluminescent display panel is inherently inefficient due to the capacitive load from the panel being reflected back into the transformer. This causes an efficiency drop due to a power factor loss created by the existence of the inductance of the transformer and the capacitance of the electroluminescent panel.

In addition, electroluminescent display devices have traditionally been driven by high power devices, usually transformers. Although transformers may be necessary to generate high voltage, they are not necessary to drive the electroluminescent displays.

This discovery has far reaching consequences on the art due to the possible reduction of the size and weight of electroluminescent display power supplies. It also has an additional benefit of making the design less susceptible to electromagnetic interference (EMI). Now, the electroluminescent display can be designed to operate at a frequency which will minimize the EMI effects.

Typical of the electroluminescent displays driven by the subject circuitry can be found by referring to U.S. Pat. No. 4,388,554 issued on June 14, 1983, to Suntola et al., which is hereby incorporated by reference.

Another type of electroluminescent display device for dashboards of an automobile is described in U.S. Pat. No. 4,323,895 issued on Apr. 6, 1982, to Coste.

Another electroluminescent display device is described in U.S. Pat. No. 4,320,169 issued on Mar. 16, 1982, to Yatabe et al.

It is an object of the present invention to improve the efficiency of electroluminescent display drivers.

It is a further object of the subject invention to improve the efficiency of electroluminescent display drivers by reducing or eliminating the effects of the power factor created in transformer driven excitation circuits.

It is still a further object of the subject invention to reduce the size and weight of traditional electroluminescent display drive circuits. And it is still another object of the subject invention to eliminate the use of a transformer to drive electroluminescent display panels.

DESCRIPTION OF THE DRAWINGS

Other objects, features and advantages of the present invention will become more fully apparent from the following detailed description of the preferred embodiment, the appended claims and in the accompanying drawings in which:

FIG. 3 shows still another embodiment of the electroluminescent display drive circuitry with a masking capacitor used to reduce the effect of the capacitance changes within the electroluminescent display;

FIG. 4 is a timing diagram showing the input signals to the drive circuit;

FIG. 5 is a schematic diagram showing a prior art electroluminescent display driver;

FIG. 6 is a graph showing the voltage across and current through the electroluminescent display as a function of time; and FIG. 7 is a graph showing the voltage across and current through the electroluminescent display as a function of time for the power supply according to the subject invention.

DETAILED DESCRIPTION OF THE PREFERRED EMBODIMENT

Figure 1:
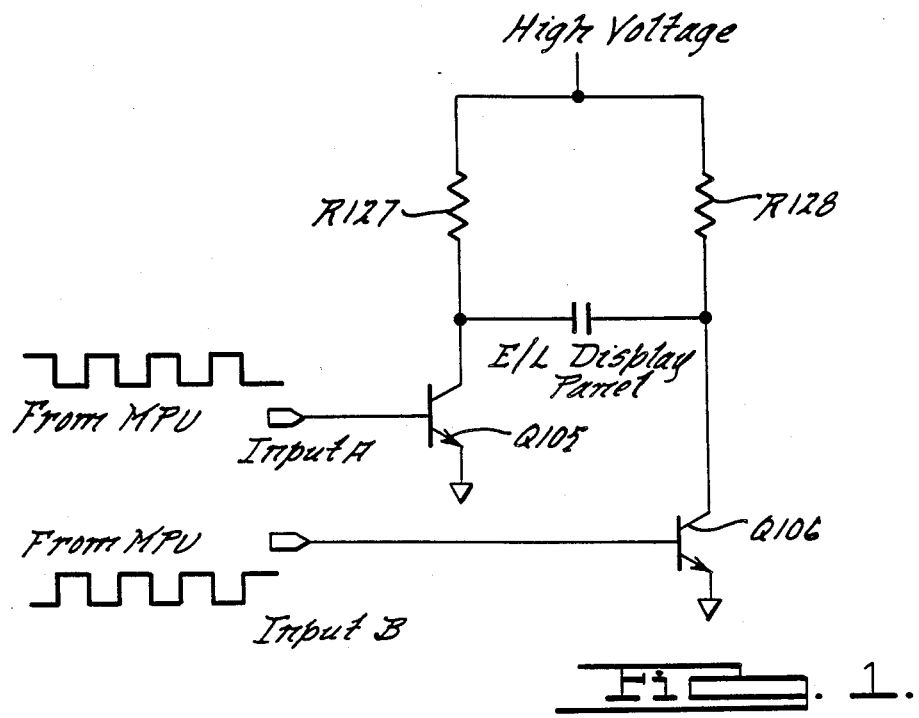
FIG. 1 shows an elementary embodiment of the electroluminescent display drive circuitry.

Referring to FIG. 1, the electroluminescent display panel is shown connected to a high voltage supply via two resistors R127 and R128.

The circuit is completed by way of two transistors Q105 and Q106, each connected to one of the resistors R127 and R128. The collectors of each of these transistors is connected to the electroluminescent display panel, one to each side. The electroluminescent display panel is depicted as a capacitor connected between the collectors of the two transistors.

The emitters of each transistor, Q105 and Q106, are then connected to ground.

The bases of each transistor, Q105 and Q106, are connected to a signal source. This signal source can be an individual oscillating circuit or it can be an output from a microprocessor. In any event, input A to Q105 is 180 degrees out of phase with input B to Q106. Both inputs are to the base of the transistors and are both square wave signals. The frequency of each input signal can be the same, just 180 degrees out of phase. However, it may be desirable to only turn one transistor on at a time. That is, keep the off time of one input signal slightly less than the on time for the other input signal. This creates a dead zone. It is designed to never allow the transistors Q105 or Q106 to be on at the same time. This keeps heat loss to a minimum and reduces stress on the transistors. There are many ways to accomplish this; the key is never to turn them both on at once. This principle is used for input A and input B with respect to FIG. 1, FIG. 2 and FIG. 3, although each would work with the signals at the same frequency but 180 degrees out of phase.

These signals are depicted in the timing diagram of FIG. 4, along with the wave form across the electroluminescent display.

In addition, varying the frequency of the input signal to increase the dead zone can be used to dim the output of the display.

It can be seen that the subject invention will drive the electroluminescent display without the use of a traditional transformer. The emphasis of traditional designs is toward power and the use of power transistors. In contrast, the subject invention utilizes transistors that operate at a much lower power and emit very little heat.

The design lends itself nicely to surface mounted devices and allows for a design which lets the designer select the resistor values for specific applications. In other words, the resistor will correspond on the capacitance of the individual electroluminescent display panel used and the frequency that it is driven at.

There is also evidence that the subject design is less susceptible to electro-magnetic interference (EMI) because it is run at a constant frequency or run at a frequency which will not interfere with the radio or other components in an automotive environment.

All of these factors are of particular importance to almost any environment, but the subject design was developed for use in an automotive environment.

In this environment, large temperature swings are usually present. In addition, size and weight are of critical importance.

Figure 2:
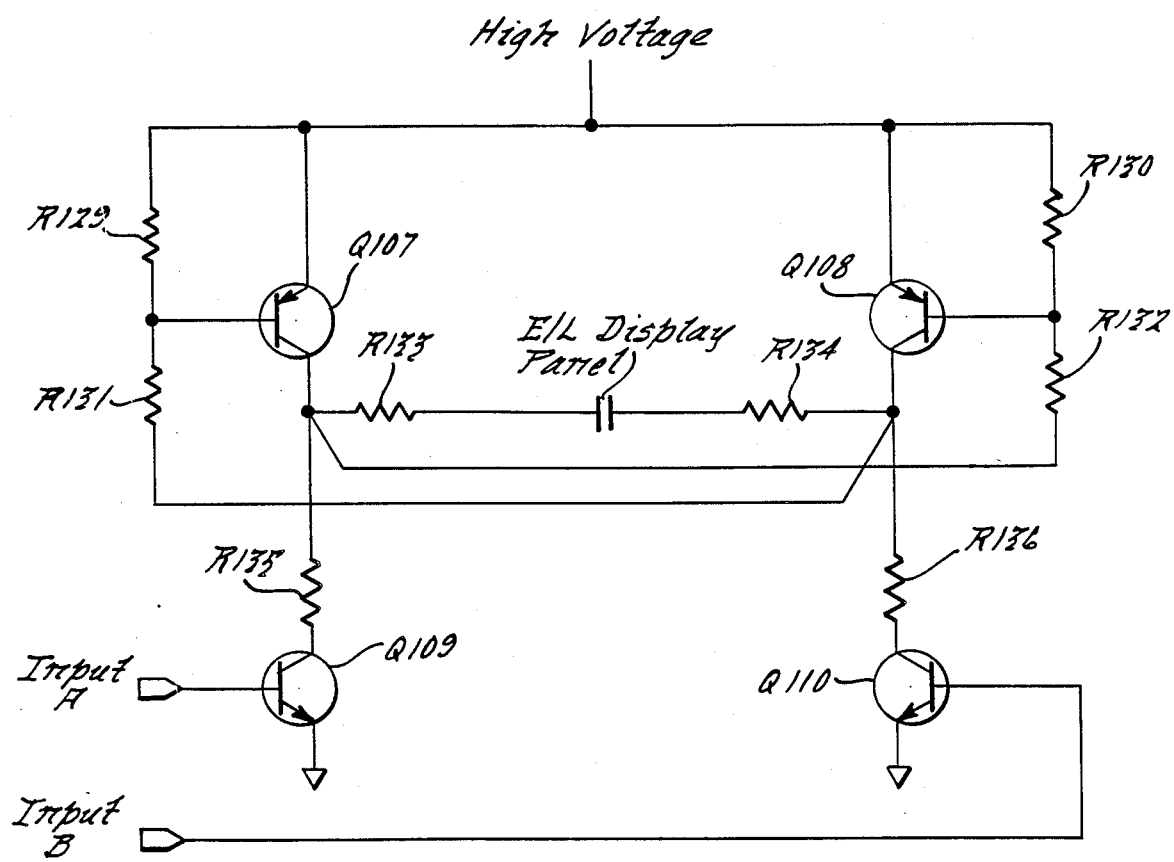
FIG. 2 shows another embodiment of the electroluminescent display drive circuitry.

Referring now to FIG. 2, another embodiment of the electroluminescent display drive circuitry is shown. The particular design calls for the inputs A and B as in FIG. 1. Both inputs A and B are fed to the base of an NPN transistor, in this case input A fed to the base of NPN transistor Q109 and input B fed to the base of NPN transistor Q110. Both transistors Q109 and Q110 are connected to ground via the emitter.

The collector of transistor Q109 is connected to one end of the electroluminescent display panel through resistors R135 and R133. As before, the electroluminescent display panel is depicted as a capacitance; this is done even though the display has inherent resistive losses. Similarly, the collector of transistor Q110 is connected to the other end of the electroluminescent display panel through resistors R136 and R134.

FIG. 2 further differs from FIG. 1 in that the electroluminescent display is connected to the high voltage through two PNP drive transistors Q107 and Q108. The emitters of the drive transistors Q107 and Q108 are tied to the high voltage and each collector is tied to the electroluminescent display panel through a time constant resistor R133 for Q107 and R134 for Q108.

The transistors Q107 and Q108 are driven by tying the base of one transistor to the collector of the other by way of a resistor. Resistor R131 ties the base of Q107 to the collector of Q108. Similarly, resistor R132 ties the base of Q108 to the collector of Q107. The emitters of each Q107 and Q108 are tied to the high voltage supply. Further bias is provided by tying the base of each transistor Q107 and Q108 to the high voltage through resistors R129 and R130 respectively.

All of the circuits shown in FIGS. 1, 2 and 3 generate an A/C voltage across the electroluminescent display panel. For more efficient operation of the display, the peak-to-peak voltage across the electroluminescent display will be approximately twice the amount of the high voltage input. This amount might be less in FIGS. 2 and 3 where the high voltage across the electroluminescent display will be slightly lower due to effect of an RC network.

The RC network is made up of the series combination of resistors R133 and R134 in series with the electroluminescent display panel shown in FIG. 2.

The RC network is FIG. 3 comprises the resistors R133 and R134 in series with the parallel combination of the electroluminescent display, along with the capacitor C112.

The efficiency of the circuits shown in FIGS. 1, 2 and 3 is very good due to the fact that a power factor of one is generated.

Electroluminescent displays are generally discussed in an article "D.C. Electroluminescence for Automobile Instruments" published by the Institute of Electrical Engineers on July 6–9, 1976, and written by B. Shepherd, R. N. Thomas and P. J. Smith. This article is hereby incorporated by reference.

Also discussing electroluminescent displays is SAE Paper 810076, "Electroluminescent Instrumentation" by B. Shepherd dated February 1981. This article is also incorporated by reference.

Referring to FIG. 5, shown is a typical excitation circuit for an electroluminescent display. Notice that a transformer is utilized such that the secondary of the transformer is connected directly across electroluminescent display. A power factor other than 1 is created due to the interaction between the inductance of the transformer and the capacitance of the electroluminescent display. In addition, the bulk and weight of a transformer is eliminated.

Prior art power supplies to drive an electroluminescent display are run at low frequency since the displays run at low frequency. This means that large transformers must be used to generate the low frequency drive.

This is shown in FIG. 5 with a +V voltage supplied to the primary of transformer T. The collector of transistor Q is connected to the primary of T; the emitter to ground; the base to an input signal I. The electroluminescent display panel is depicted as a capacitor connected across the secondary of transformer T.

The circuits described in the subject invention run at high frequencies and create a voltage without a power factor to contend with.

Examples of waveforms in prior art power supplies and in the subject invention are shown in FIG. 6. Examples of waveforms for the power supplies of the present invention are shown in FIG. 7. Both FIG. 6 and FIG. 7 graph voltage and current as a function of time. It can be seen that the power factor is not an issue in FIG. 7 as the current through the electroluminescent display is in phase with the voltage across it.

The subject circuit does not introduce a transformer to the direct excitation of the display and, therefore, reduces the size and weight of the design. In addition, the subject invention eliminates or reduces the effect of the power factor as no inductance is present in the direct excitation of the electroluminescent display drive circuit; this is because current and voltage are in phase.

Referring again to FIG. 4, capacitor C112 is shown connected in parallel across the capacitive electroluminescent display panel. The capacitor C112 is used to mask or reduce the effect of capacitance changes of the electroluminescent display panel.

Over a period of time, the electroluminescent display panel will change in its inherent capacitance due to age. In general, the electroluminescent display will decrease in capacitance over a period of time.

When the capacitance of the electroluminescent display panel changes, the voltage across the panel increases due to the new and shorter RC time constant created by the changed capacitance; i.e., the RC charging time effects of resistors R133, R134 in series with the parallel combination of the electroluminescent display and capacitor C112. This shorter RC time constant provides for a constant output from the electroluminescent display panel. Therefore, the panel can be used for a longer period of time since the affects of again are masked by the higher voltage input.

Typically, the capacitance of the electroluminescent display drops to about one-half of the capacitance of its original capacitance between 500 and 1,000 hours of operation. Therefore, if capacitor C112 is chosen to be approximately equal to the capacitance of the electroluminescent display when new, the above-described increases in the voltage across the electroluminescent display will increase the peaks of the electroluminescent voltage waveform shown in FIG. 7.

If capacitor C112 is chosen to be much larger than the electroluminescent capacitance, i.e., such that the capacitance of C112 is ten times or more greater than the capacitance of the electroluminescent display, then the effect of the capacitance change in the electroluminescent display will be felt as the voltage across the panel will remain relatively constant due to the lack of change in the RC time constant.

Alternatively, if the capacitance of capacitor C112 is much smaller than the capacitance of the electroluminescent display, then the aging effects of the electroluminescent display on its inherent capacitance will be exaggerated.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

I claim:

1. An non-inductive electroluminescent display drive circuit comprising:

a high voltage low power source;

an electroluminescent display panel;

two low power signal transistors;

a source of two input signals presented to the base of each signal transistor where the input signals to one transistor is 180 degrees out of phase with the input signals to the second transistor;

the electroluminescent display panel being connected between the collectors of each transistor; and the electroluminescent display panel further being connected to the high voltage source through two resistors such that the voltage generated across the electroluminescent display panel is in phase with the current passing through the electroluminescent display panel.

2. The electroluminescent display drive circuit of claim 1 where the emitters of each signal transistor are connected to ground.

* * * * *